3,218,148
METHOD OF ELIMINATING ANNUAL WEEDS
Enrico Knüsli, Riehen, near Basel, Jürg Rumpf, Binningen, near Basel, and Hans Gysin, Basel, Switzerland, assignors to J. R. Geigy A.G., Basel, Switzerland
No Drawing. Continuation of application Ser. No. 848,226, Oct. 23, 1959. This application Mar. 14, 1963, Ser. No. 265,055
Claims priority, application Switzerland, Nov. 5, 1958, 65,810
2 Claims. (Cl. 71—2.5)

This application is a continuation of our pending patent application Serial No. 848,226 filed October 23, 1959, now abandoned.

The present invention concerns new triazine derivatives having valuable herbicidal properties as well as their use for the inhibition of plant growth.

It has been found that s-triazine derivatives of the general formula

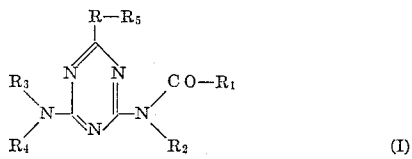

wherein
—CO—$R_1$ represents a lower alkanoyl radical,
$R_2$ represents hydrogen or a lower alkyl, alkenyl or alkoxyalkyl radical,
$R_3$ represents a lower alkyl, alkenyl or alkanoyl radical,
$R_4$ represents a lower alkyl, alkenyl or alkoxyalkyl radical,
$R_5$ represents a lower alkyl, alkenyl or alkoxyalkyl radical, and
X represents the direct linkage, O, S, NH or a lower alkylimino, alkenylimino or alkanoylimino radical, have an excellent herbicidal action.

Corresponding to the definition for X and $R_5$, the compounds embraced by the general Formula I are derivatives of diaminotriazines and triamino-s-triazines. The more important representatives of these groups of substances are embraced by the following general formulae

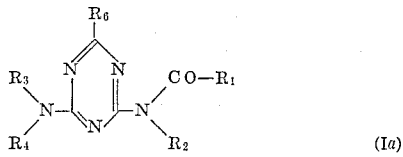

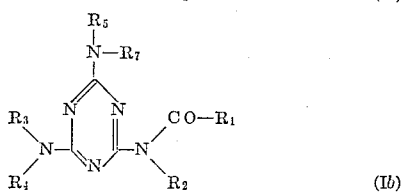

wherein
$R_6$ represents a lower alkyl, alkoxy, alkenyloxy, alkylmercapto or alkenylmercapto radical,
$R_7$ represents hydrogen or a lower alkyl, alkenyl or alkanoyl radical
and $R_1$—CO—, $R_2$, $R_3$, $R_4$ and $R_5$ have the meanings given in general Formula I. Particularly valuable compounds are those of the general Formula Ia, in which —CO—$R_1$ is a lower alkanoyl radical, $R_2$ is hydrogen or a lower alkyl radical, $R_3$ represents a lower alkyl or alkanoyl radical, $R_4$ represents hydrogen or a lower alkyl radical and $R_6$ represents a lower alkoxy radical.

To produce the new triazine derivatives defined above, compounds of the general formula

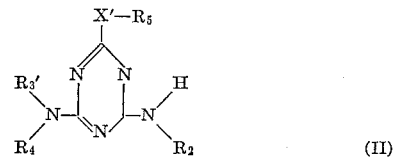

wherein
$R_3'$ represetns hydrogen or a radical corresponding to the definition for $R_3$ with the exception of a low molecular alkanoyl radical,
X' represents a radical corresponding to the definition for X with the exception of a low molecular alkanoylimino radical, and
$R_2$, $R_4$ and $R_5$ have the meanings given above, are reacted with a reactive functional derivative of a low molecular alkanoic acid, in particular with an anhydride, for example, with acetanhydride, propionic acid, butyric acid or isobutyric acid anhydride and also, as reactive derivative of formic acid to introduce the formyl radical, with formic acid-acetic acid anhydride. If in the starting materials, $R_3'$ is hydrogen and/or X' is NH, then, depending on the reaction conditions, e.g. time and temperature, monoacyl, diacyl and, possibly, triacyl derivatives can be otbained. However, it can be seen from general Formula I that an acyl radical is introduced into every primary amino group present and that, therefore, starting materials in which $R_2$, $R_3'$ and $R_4$ are hydrogen must always be at least diacylated.

Suitable starting materials of the general Formula II are, for example:
2-methyl-4,6-diamino-2-triazine,
2-methyl-4,6-bis-ethylamino-s-triazine,
2-methyl-4,6-bis-isopropylamino-s-triazine,
2-ethyl-4,6-bis-allylamino-s-triazine,
2-n-propyl-4,6-bis-ethylamino-s-triazine,
2-methoxy-4,6-diamino-s-triazine,
2-methoxy-4-amino-6-ethylamino-s-triazine,
2-methoxy-4-amino-6-isopropylamino-s-triazine,
2-methoxy-4-amino-6-allylamino-s-triazine,
2-methoxy-4-amino-6-diethyl-amino-s-triazine,
2-methoxy-4-amino-6-diallyamino-s-triazine,
2-methoxy-4-amino-6-($\gamma$-isopropoxy-propylamino)-s-triazine,
2-methoxy-4,6-bis-ethylamino-s-triazine,
2-methoxy-4-methyl-amino-6-isopropylamino-s-triazine,
2-methoxy-4-ethylamino-6-isopropylamino-s-triazine,
2-methoxy-4,6-bis-n-propylamino-s-triazine,
2-methoxy-4,6-bis-isopropylamino-s-triazine,
2-methoxy-4,6-bis-n-butylamino-s-triazine,
2-methoxy-4,6-bis-allylamino-s-triazine,
2-methoxy-4,6-bis-methallyl-amino-s-triazine,
2-methoxy-4,6-bis($\beta$-methoxy-ethylamino)-s-triazine,
2-methoxy-4,6-bis($\gamma$-methoxy-propylamino)-s-triazine,
2-methoxy-4-ethylamino-6-diethylamino-s-triazine,
2-methoxy-4-isopropylamino-6-diethylamino-s-triazine,
2-ethoxy-4,6-bis-ethylamino-s-triazine,
2-ethoxy-4,6-bis-isopropylamino-s-triazine,
2-n-propoxy,4,6-bis-ethylamino-s-triazine,
2-allyloxy-4,6-bis-ethylamino-s-triazine,
2-methoxyethoxy-4,6-bis-ethylamino-s-triazine,
2-ethoxy-ethoxy-4,6-bis-ethylamino-s-triazine,
2-methylmercapto-4,6-bis-ethylamino-s-triazine,
2-methylmercapto-4,6-bis-isopropylamino-s-triazine,
2-methylmercapto-4,6-bis-allylamino-s-triazine,
2-methylmercapto-4,6-bis-($\gamma$-methoxypropylamino)-s-triazine,
2-isopropylmercapto-4,6-bis-ethylamino-s-triazine,
2-allylmercapto-4,6-bis-ethylamino-s-triazine, 2,4-diamino-6-ethylamino-s-triazine,
2-amino-4,6-bis-ethylamino-s-triazine,
2-amino-4,6-bis-diethylamino-s-triazine,
2,4-bis-ethylamino-6-diethylamino-s-triazine,
2,4-bis-ethylamino-6-diallylamino-s-triazine,
2,4,6-tris-ethylamino-s-triazine,
2,4,6-tris-ispropylamino-s-triazine,
2,4,6-tris-allylamino-s-triazine,
2,4,6-tris(γ-methoxy-propylamino)-s-triazine,
2-methylamino-4,6-bis-diethylamino-s-triazine and
2-ethylamino-4,6-bis-diethylamino-s-triazine.

The greater part of these starting materials is known, the others are produced by known methods.

The following examples further illustrate the production of the new active ingredients according to the invention. Parts are given therein as parts by weight and the temperatures are in degrees centigrade.

EXAMPLE I 20 parts of 2-methoxy-4,6-bis-ethylamino-s-triazine are refluxed for 5 hours with 100 parts of acetanhydride. The excess acetanhydride and the acetic acid formed are then distilled off in the vacuum and the residue is rectified. 2-methoxy-4,6-bis-(N-acetyl-ethylamino)-s-triazine passes over at 138–142° under 0.001 mm. pressure.

The following compounds are obtained in an analogous manner:

2-methoxy-4-isopropylamino-6-(N-acetyl-isopropyl-amino)-s-triazine, B.P.$_{0.4}$ 136–140°, M.P. 102–104°,
2-methoxy-4-n-propylamino-6-(N-acetyl-n-propylamino)-s-triazine,
2-methoxy-4-diethylamino-6-(N-acetyl-ethylamino)-s-triazine, B.P.$_{0.003}$ 141–144°,
2-ethoxy-4-,6-bis-(N-acetyl-ethylamino)-s-triazine, B.P.$_{0.004}$ 150–153°,
2-ethoxy-4-isopropylamino-6-(N-acetyl-isopropyl-amino)-s-triazine,
2-ethoxy-4-n-butylamino-6-(N-acetyl-n-butylamino)-s-triazine,
2-n-propoxy-4,6-bis-(N-acetyl-ethylamino)-s-triazine, B.P.$_{0.001}$ 139–142°,
2-allyloxy-4,6-bis-(N-acetyl-ethylamino)-s-triazine, B.P.$_{0.0002}$ 168°,
2-methoxyethoxy-4,6-bis-(N-acetyl-ethylamino)-s-triazine,
2-ethoxyethoxy-4,6-bis-(N-acetyl-ethylamino)-s-triazine, B.P.$_{0.0004}$ 170–178°,
2-methylmercapto-4-ethylamino-6-(N-acetyl-ethyl-amino)-s-triazine, M.P. 98–100° (from cyclohexane),
2-methylmercapto-4-isopropylamino-6-(N-acetyl-isopropylamino)-s-triazine
2-isopropylmercapto-4-ethylamino-6-(N-acetyl-ethylamino)-s-triazine,
2,4-bis-isopropylamino-6-(N-acetyl-isopropylamino)-s-triazine,
2-diethylamino-4,6-bis-(N-acetyl-ethylamino)-s-triazine, M.P. 59–62° (from petroleum ether),
2-acetylamino-4,6-bis-diethylamino-s-triazine, M.P. 78–80°,
2-acetylamino-4,6-bis-diallylamino-s-triazine,
2-methyl-4,6-bis-(N-acetyl-ethylamino)-s-triazine, B.P.$_{0.001}$ 110–121°,
2-n-propyl-4,6-bis-(N-acetyl-ethylamino)-s-triazine, B.P.$_{0.0003}$ 164–169°,
2-methoxy-4-allylamino-6-(N-acetyl-allylamino)-s-triazine, and
2-diallylamino-4,6-bis-(N-acetyl-ethylamino)-s-triazine.

EXAMPLE II 22.8 parts of 2-methoxy-4,6-bis-isopropylamino-s-triazine are refluxed for 48 hours in 150 parts of acetanhydride. The acetic acid and the excess acetanhydride are distilled off in the vacuum and the residue is rectified in a high vacuum whereupon 2-methoxy-4,6-bis-(N-acetyl-isopropylamino)-s-triazine is obtained. B.P.$_{0.06}$ 130–134°.

The following compounds are obtained in an analogous manner:

2,4,6-tris-(N-acetyl-ethylamino)-s-triazine M.P. 71–74° (from petroleum ether),
2-methoxy-4,6-bis-(N-acetyl-γ-methoxy-propyl-amino)-s-triazine, B.P.$_{0.004}$ 176–178°,
2-ethoxy-4-,6-bis-(N-acetyl-β-methoxy-ethylamino)-s-triazine,
2-methylmercapto-4,6-bis-(N-acetyl-ethylamino)-s-triazine, B.P.$_{0.015}$ 164°,
2-methoxy-4-acetylamino-6-(N-acetyl-ethylamino)-s-triazine, M.P. 98° (from cyclohexane),
2-methoxy-4,6-bis-(N-propionyl-ethylamino)-s-triazine, B.P.$_{0.01}$ 142–143°,
2-methoxy-4,6-bis-(N-n-butyryl-ethylamino)-s-triazine, B.P.$_{0.003}$ 159–162°,
2-methoxy-4,6-bis-(N-isobutyryl-ethylamino)-s-triazine, B.P.$_{0.03}$ 162°,
2-ethoxy-4-isopropylamino-6-(N-acetyl-isopropylamino)-s-triazine, M.P. 95–96°.

EXAMPLE III 239 parts of 2-methoxy-4-diethylamino-6-isopropyl-amino-s-triazine are dissolved in 204 parts of acetanhydride and the solution is refluxed for 36 hours. The acetic acid and the acetanhydride are distilled off in the vacuum and the residue is distilled at 150° under 0.1 mm. pressure.

The distillation residue is again refluxed for 20 hours with 20 parts of acetanhydride and is then worked up as described above. 175 parts of 2-methoxy-4-diethylamino-6-(N-acetyl-isopropylamino)-s-triazine which boils at 148° under 0.05 mm. pressure are obtained.

EXAMPLE IV 330 parts of acetanhydride are added to 211 parts of 2-methoxy - 4 - ethylamino-6-isopropylamino-s-triazine and the whole is refluxed for 20 hours. The acetanhydride and acetic acid are then distilled off. The same process is repeated with 200 parts of acetanhydride (15 hours) and 100 parts of acetanhydride (2 hours). The crude product is dissolved in 400 parts of ether and then stirred for 3 hours with 100 parts of 5% sodium carbonate solution. After separating the phases, the ethereal phase is washed first with 40 parts of sodium carbonate solution, then with 300 parts of 4 N-hydrochloric acid and then with 150 parts of water, these latter three liquids being used in portions. After drying over sodium sulphate, the ether is distilled off and the 2-methoxy-4-(N-acetyl-ethyl-amino)-6-(N-acetyl-isopropylamino)-s-triazine is dried in a high vacuum at 75° under 0.01 mm. pressure. B.P.$_{0.0005}$ 122–124°.

2 - ethoxy-4,6-bis-(N-acetyl-isopropylamino)-s-triazine, produced in an analogous manner, boils at 148–153° under 0.006 mm. pressure.

EXAMPLE V 89 parts of acetanhydride and 43 parts of formic acid are heated for 2 hours at 50–60°, then cooled and 40 parts of 2-methoxy-4,6-bis-ethylamino-s-triazine and 100 parts of ether are added. The reaction mixture is then stirred for 84 hours at 20°, then for 2 hours at 60° whereupon the solvents are distilled off, finally in the vacuum. The residue is recrystallized first from cyclohexane, then from hexane and finally from isopropyl ether. The 2-methoxy-4-ethylamino-6-(N-formyl-ethyl-amino)-s-triazine melts at 99–101°.

2-methylmercapto-4-ethylamino - 6 - (N-formyl-ethyl-amino)-s-triazine (M.P. 107–110° from cyclohexane) is produced in an analogous manner.

The compounds named above as well as others of the general Formula I defined above are excellently suitable as active ingredients for weed killers, both for the selective control of weeds among cultivated plants as well as for the total destruction and inhibition of undesired plant growth. By weeds are meant here also undesired cultivated plants, for example, those from a previous crop. The compounds defined above also are suitable as active ingredients for the attainment of other inhibitory influences on plant growth, in particular defoliation, e.g. of cotton plants, desiccation e.g. of potato plants, also for blossom thinning, prolongation of the harvesting period and storing propensities.

The weed killers according to the invention can be used in the form of solutions, emulsions, suspensions, pastes, dusts or granules. All forms of application, however, must ensure that the active ingredient is contained in a finely distributable form. In particular, when used for the total destruction of plant growth, early desiccation as well as defoliation, the action can be increased by the use of carriers having a phytotoxic action such as, e.g. high boiling mineral oil fractions; on the other hand, the selectivity of the inhibitory action, e.g. in selective weed killing, is generally better attained by using carriers which are inert to plants.

In particular higher boiling organic liquids such as mineral oil fractions, coal tar oils as well as also vegetable and animal oils are used for the production of solutions. In order to more easily dissolve the active ingredients in these liquids, possibly slight amounts of organic liquids having better dissolving powers and generally a lower boiling point can be added, i.e. solvents such as alcohols, e.g. ethanol or isopropanol, ketones, e.g. acetone, butanone or cyclohexanone, diacetone alcohol, cyclic hydrocarbons e.g. benzene, toluene or xylene, chlorinated hydrocarbons e.g. tetrachlorethane or ethylene chloride or mixtures of such substances.

The aqueous forms of application are chiefly emulsions and dispersions. The substances are homogenised in water either as such or in one of the solvents named above, with the aid of surface active emulsifying or dispersing agents. Cation active emulsifying agents are, e.g. quaternary ammonium compounds and alkyl polyoxyethylene amines such as Katapol PN–430 of Antara Chemicals. Anion active emulsifying and dispersing agents comprise soap, soft soaps, salts of alkylaryl sulphonates such as Nekal BX–78 of Antara Chemicals, Ninate 402 of Ninol Laboratories Inc., Sellogen HR of Jacques Wolf & Co., Tinovetin B of J. R. Geigy A.G., salts of fatty alcohol sulphates such as Duponol L 144–WDG of E. I. Du Pont de Nemours & Co., salts of sulphonates of vegetable or animal oils, and complex sulphonates such as Emcol H–A, H–B and H–C of Emulsol Chemical Corp. Nonionic emulsifying agents are, e.g. polyethylene glycol ethers of alkylphenols an dother polyethers such as Triton X–100 of Rohm & Haas Co., Agrimul 70A and 70B of Nopco Chemicals Co., polyethylene glycol esters of fatty acids such as Nonisol 100 and Nonisol 200 of Geigy Chemical Corp. and Emulsan O and Emulsan K of Reilly-Whiteman-Walton Co., polyoxyethylene sorbitan esters of fatty acids used together with corresponding sorbitan esters such as Tween 60 together with Span 60 of Atlas Powder Co. Anionic agents are used in many cases advantageously in combination with nonionic agents or use is made of commercial blends of anionic and nonionic agents such as Toximal 500 of Ninol Laboratories, Agrimul GA of Nopco Chemical Co., Emcol H 400, H 500, H 600, H 700 or H 800 of Emulsol Chemical Corp., HS–31 Emulsifier of Thompson Chemicals Corp. or T–H Emulsifiers of Thompson-Hayward Chemical Co. Liquid or pasty concentrates suitable for dilution with water comprise a herbicidal substances according to the invention, an emulsifying or dispersing agent and, possibly, a solvent as mentioned above.

Dusts and sprinkling agents can be produced by mixing or milling the active ingredient with a solid carrier. Such carriers are: talcum, diatomaceous earth, kaolin, bentonite, calcium carbonate, tricalcium phosphate, sand, or also sawdust, ground cork, and other materials of vegetable origin. On the other hand, the carriers can also be impregnated with solutions of the active ingredients in a volatile solvent and evaporating the latter. By the addition of surface active agents, e.g. the emulsifying agents mentioned above, and protective colloids, e.g. sulphite waste liquor, pulverulent preparations and pastes can be made suspendable in water and used as sprays.

The various forms for application can be more closely adapted to the intended use in the usual way by the addition of substances which improve or decrease the distribution and penetration into the ground depending on the depth of roots of the weeds to be destroyed. The biological effect can be widened by the addition of substances having bacterical or fungicidal properties, for example, for the attainment of a general earth sterilisation or, in selective weed killing, for the protection of cultivated plants from other injurious organisms. Substances which also influence plant growth, such as, e.g. 3-amino-1,2,4-triazole to accelerate the onset of action, or, e.g. salts of $\alpha,\alpha$-dichloropropionic acid to widen the range of herbicidal action, may possibly be desirable. A combination with fertilisers may be labour saving and can favour the action of the herbicide.

The amounts of active ingredient necessary per acre vary in selective weed killing dependent on the sensitivity of the weeds, the resistance of the cultivated plants, the time of application, climatic conditions and the condition of the ground, between about 0.25 and 10 lbs. per acre (2.5–100 g. per 100 sq. metres), whilst for the complete elimination of plant growth generally about 5–20 lbs. per acre (50–200 g. per 100 sq. metres) should be used. In certain cases, however, the above amounts can also be exceeded.

Examples of typical forms of application are given below:

*Example 1*

10 parts of active ingredient, e.g. 2-methoxy-4-(N-acetylethylamino) - 6 - (N - acetyl - isopropylamino) - s - triazine or 2-acetylamino-4,6-bis-diethylamino-s-triazine, and 90 parts of talc are milled to the greatest degree of fineness in a ball mill, a pin beater mill or another suitable mill. The mixture obtained serves as a dust.

*Example 2*

20 parts of active ingredient, e.g. 2-methoxy-4,6-bis-(N-acetyl-ethylamino)-s-triazine, 2-methoxy-4-(N-acetyl-ethylamino) - 6 - (N - acetyl - isopropylamino) - s - triazine, 2-methyl-4,6-bis-(N-acetyl-ethylamino)-s-triazine, 2 - diallylamino - 4,6 - bis - (N - acetyl - ethylamino) - s-triazine or 2-acetylamino-4,6-bis-(diethylamino)-s-triazine, are dissolved in a mixture of 48 parts of diacetone alcohol, 16 parts of xylene and 16 parts of an anhydrous high molecular condensation product of ethylene oxide and higher fatty acids. This concentrate can be diluted with water to form emulsions of any concentration desired.

*Example 3*

50–80 parts of active ingredient, e.g. 2-methoxy-4-(N-acetyl - ethylamino) - 6 - (N - acetyl - isopropylamino)-s-triazine, 2-methylmercapto-4-ethylamino-6-(N-acetyl-ethylamino) - s - triazine, 2 - acetylamino - 4,6 - bis - (diethylamino) - s - triazine, 2 - diethylamino - 4,6 - bis - (N-acetyl - ethylamino) - s - triazine or 2,4,6 - tris - (N - acetyl-ethylamino)-s-triazine, are mixed with 2–5 parts of a wetting agent, e.g. a sulphuric acid ester of an alkyl-polyglycol ether, 1–5 parts of a protective colloid, e.g. sulphite waste liquor, and 14–44 parts of an inert solid carrier such as, e.g. kaolin, bentonite, chalk or kieselguhr and the mixture is then finely milled in a suitable mill. The wettable powder obtained can be stirred with water and produces very stable suspensions.

Example 4

10 parts of active ingredient, e.g. 2-methoxy-4,6-bis-(N - acetyl - ethylamino) - s - triazine, 2 - methoxy - 4,6-bis - (N - propionyl - ethylamino) - s - triazine or 2,4,6-tris-(N-acetyl-ethylamino)-s-triazine are dissolved in 60–80 parts of a high boiling organic liquid such as, e.g. coal tar oil, diesel oil or spindle oil to which 30–10 parts of xylene have been added. It can be used as a spray.

Example 5

5–10 parts of active ingredients, e.g. 2-methoxy-4-(N-acetyl - ethylamino) - 6 - (N - acetyl - isopropylamino) - s-triazine, 2 - methoxy - 4 - ethylamino - 6 - (N - formyl-ethylamino) - s - triazine, 2 - acetylamino - 4,6 - bis - (di-ethylamino) - s - triazine or 2 - diethylamino - 4,6 - bis-(N-acetyl-ethylamino)-s-triazine, are mixed and milled with 95–90 parts of calcium carbonate (=ground limestone). The product can be used as a sprinkling agent.

Example 6

95 parts of a granular carrier such as, e.g. sand or calcium carbonate, are moistened with 1–5 parts of water, isopropanol or polyethylene glycol and then 5 parts of active ingredient, e.g. 2-ethoxy-4,6-bis-(N-acetyl-isopropylamino) - s - triazine or 2 - methoxy - 4 - (N - acetyl-ethylamino) - 6 - (N - acetyl - isopropylamino) - s - triazine are mixed in.

A greater amount, e.g. 100–900 parts of a possibly water soluble fertiliser such as, e.g. ammonium sulphate or urea can be added to the above mixture or one containing more active ingredient, e.g. 10 parts of active ingredient and 90 parts of calcium carbonate. The granulate obtained can be used as sprinkling agent.

Example 7

50 parts of active ingredient, e.g. 2-methoxy-4-(N-acetyl - ethylamino) - 6 - (N - acetyl - isopropylamino) - s-triazine, 2 - methoxy - 4,6 - bis - (N - acetyl - ethylamino)-s - triazine, 2 - methoxy - 4 - (N - acetyl - isopropyl-amino) - s - triazine, 2 - ethoxy - 4,6 - bis - (N - acetyl-isopropylamino) - s - triazine or 2- acetylamino - 4,6-bis-(diethylamino)-s-triazine, are added to 45 parts of xylene and the whole is combined with 5 parts of Toximul 500. A concentrate for the preparation of emulsions which can be emulsified in any ratio desired in water is obtained.

Example 8

On May 20 and 21, 1959, various cultivated plants were sown in slightly marly sandy soil containing little organic matter (not fertilised).

On May 22, the plots were treated with 0.2 litre per sq. m. of a suspension containing 0.05% of 2-methoxy-4-(N - acetyl - ethylamino) - 6 - (N -acetyl - isopropyl-amino)-s-triazine prepared from 50% wettable powder (0.1 g. active substance per sq. m., about 0.9 lb. per acre). On evaluating the test on July 22, 98% of the annual weeds in the plots treated had been destroyed, whilst the cultivated plants, flax, peas, spinach, cucumbers and potatoes were not affected.

In all, 128.5 mm. rain fell during the test period, 101.1 mm. of which fell between June 20 and 29. The plots were sprayed when no rain fell.

What we claim is:

1. A method of eliminating annual weeds from amongst growing cultivated plants which comprises applying to the plot wherein said plants have been sown and prior to the emergence of the plants an agricultural composition comprising a triazine derivative of the formula

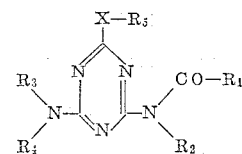

wherein

—$CO—R_1$ represents a lower alkanoyl, $R_2$ represents a member selected from the group consisting of hydrogen, lower alkyl, lower alkenyl and lower alkoxyalkyl, $R_3$ represents a member selected from the group consisting of lower alkyl, lower alkenyl and lower alkanoyl, $R_4$ represents a member selected from the group consisting of lower alkyl, lower alkenyl and lower alkoxyalkyl, $R_5$ represents a member selected from the group consisting of lower alkyl, lower alkenyl and lower alkoxyalkyl, X represents a member selected from the group consisting of the direct linkage, O, S, NH, lower alkylimino, lower alkenylimino and lower alkanoylimino.

2. A method of selectively eliminating undesired plant growth which comprises bringing 2-methoxy-4-(N-acetyl-ethylamino)-6-(N-acetyl-isopropylamino)-s-triazine into contact with at least part of each undesired plant in an amount sufficient to inhibit growth of such plant but insufficient to prejudicially affect the growth of coexisting cultivated plants.

References Cited by the Examiner

UNITED STATES PATENTS

| | | | |
|---|---|---|---|
| 2,273,687 | 2/1942 | Bock et al. | 260—249.8 |
| 2,507,700 | 5/1950 | Emerson et al. | 260—249.6 |
| 2,909,420 | 10/1959 | Gysin et al. | 71—2.5 |
| 2,909,421 | 10/1959 | Gysin et al. | 71—2.5 |

OTHER REFERENCES

Grundmann et al.: Chemiches Berichte, vol. 83, pages 452 to 455 (1950).

Ostrogovich et al.: Gazz. Chim. Ital., vol. 62, pages 317–328 (1932).

Smolin et al.: "s-Triazines and Derivatives," Interscience Publishers, Inc., New York, 1959, pages 251, 252 and 333 to 337.

LEWIS GOTTS, *Primary Examiner.*